(No Model.)
G. OTTO.
POCKET BATTERY.
No. 338,770. Patented Mar. 30, 1886.
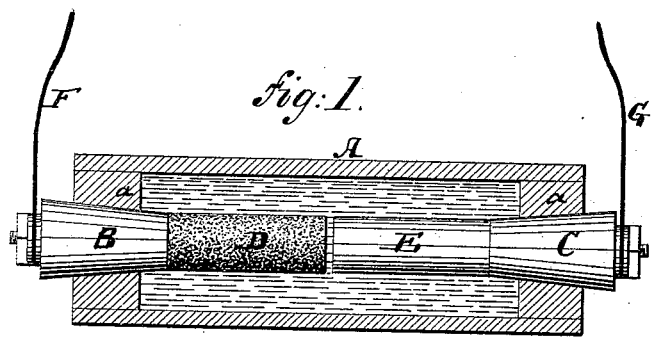
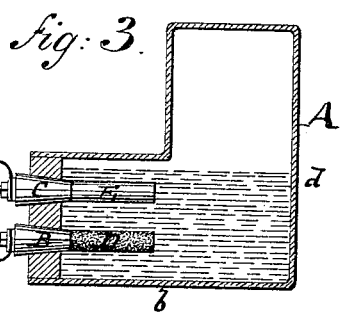
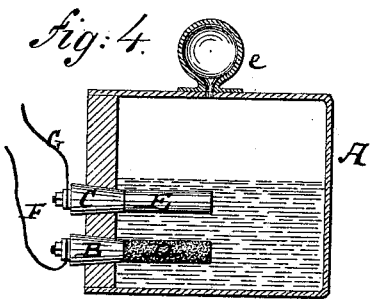
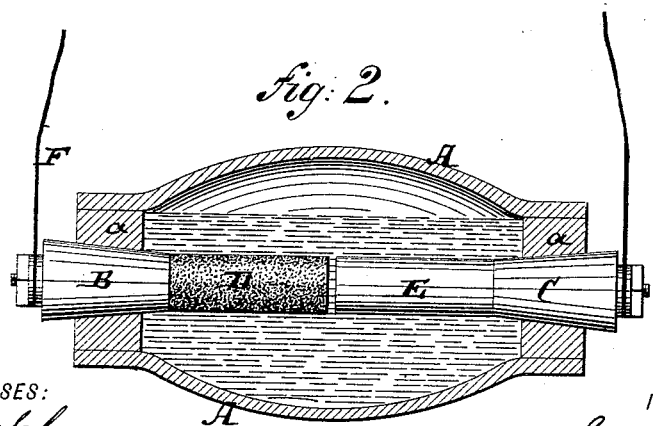
WITNESSES:
A. Schehl.
Harry M. Burk
INVENTOR
Gustav Otto
BY Briesen & Steele
ATTORNEYS.

UNITED STATES PATENT OFFICE.

GUSTAV OTTO, OF JERSEY CITY, NEW JERSEY.

POCKET-BATTERY.

SPECIFICATION forming part of Letters Patent No. 338,770, dated March 30, 1886.

Application filed October 23, 1885. Serial No. 180,718. (No model.)

*To all whom it may concern:*

Be it known that I, GUSTAV OTTO, a resident of Jersey City Heights, in the county of Hudson and State of New Jersey, have invented an Improved Pocket-Battery, of which the following is a full, clear, and exact description, reference being made to the accompanying drawings, in which—

Figure 1 represents a central longitudinal section of my improved pocket-battery. Fig. 2 is a similar section of the same when expanded. Figs. 3 and 4 represent modifications of the same.

The object of this invention is to construct an electric battery which is to be carried about in one's pocket or otherwise placed where its leakage would cause injury. In these batteries a considerable amount of gas is generated when the circuits are closed, and because of the development of gas ordinary batteries cannot be wholly inclosed, and are therefore not safe pocket-batteries.

My invention consists in making the body of a battery entirely of flexible material—such as vulcanized india-rubber—which wholly incloses the electrodes and the liquid contents of the battery, and which is sufficiently flexible to expand under the influence of gases generated within it.

In the accompanying drawings, the letter A represents a shell or body of a battery. The same is made of india-rubber or other flexible substance, so as to be capable of expanding under the influence of gases. Fig. 2 shows the battery which is represented in Fig. 1 to be thus expanded. The ends *a* of said body or shell are, by preference, also made of india-rubber, but not necessarily so, inasmuch as they need not be expansible; hence, when I speak of a "flexible body" in this specification, I mean a body which is flexible at the sides or at the ends, or throughout, to render it expansive.

B and C are rubber blocks or stoppers, to which the electrodes D and E are respectively secured. These blocks or stoppers fit appropriate cavities in the ends of the shell A, and serve to entirely seal the shell of the battery. The said blocks also carry the conductors F and G, respectively, which, when connected, serve to close the circuit.

Fig. 1 represents the entire battery in condition for use, the liquid being contained within the expansible shell. When the circuit is closed, gas will generate in the battery, and will gradually expand the shell, as in Fig. 2, but meanwhile the battery itself will remain sealed. Thus leakage is prevented, and waste also, and the battery is safe to use in places in which an ordinary battery, because of leakage, would be objectionable. Whenever one of the stoppers is removed, the gas which has accumulated will be conveniently discharged.

The invention is not only applicable to pocket-batteries, but to all other batteries. Thus, in Fig. 3 it is shown in form of an L-shaped body, A, which is wholly or partly made of india-rubber, in order to be expansible in the sense stated, and which, when placed, as in Fig. 3, so as to rest on the base *b*, will cause the electrodes to dip into the acid, while when said shell is turned to rest upon its face *d* the electrodes will thereby be taken out of the acid.

Another modification is shown in Fig. 4, in which the partly-expansible body A of the battery is provided with a still more expansible air-chamber, *e*, which forms part of the body. Other forms of shell of the battery may be substituted for those shown without a departure from the spirit or principle of my invention.

Instead of securing each electrode D E to a separate stopper, B C, both may, if desired, be carried by one single stopper.

I do not claim a pile of rigid material carrying a compression-bag at one end for the exciting-liquid and a flexible air-reservoir on the other end, as shown in English Patent No. 4,206 of 1875.

My invention is confined to self-acting batteries that contain the electrodes in the exciting-liquid and that are expansible, but do not require to be compressed to make them work.

I claim—

1. An electric battery made of flexible india-rubber, to render it an expansible gas-holder, and provided with electrodes that dip into its liquid contents when said battery is in its normal position, substantially as and for the purpose described.

2. The flexible battery-shell A, combined with one or more stoppers, B C, carrying the electrodes, as specified, said battery when in use being wholly closed by said stopper or stoppers, as set forth.

3. An electric battery constructed of a flexible shell, which wholly incloses the electrodes and the acid, and provides against the escape of gases that are generated when the battery is in use, as specified.

GUSTAV OTTO.

Witnesses:
 HARRY M. TURK,
 GUSTAV SCHNEPPE.